Mar. 13, 1923.
W. L. TRESEMER ET AL
VALVE
Filed Mar. 15, 1922
1,448,580
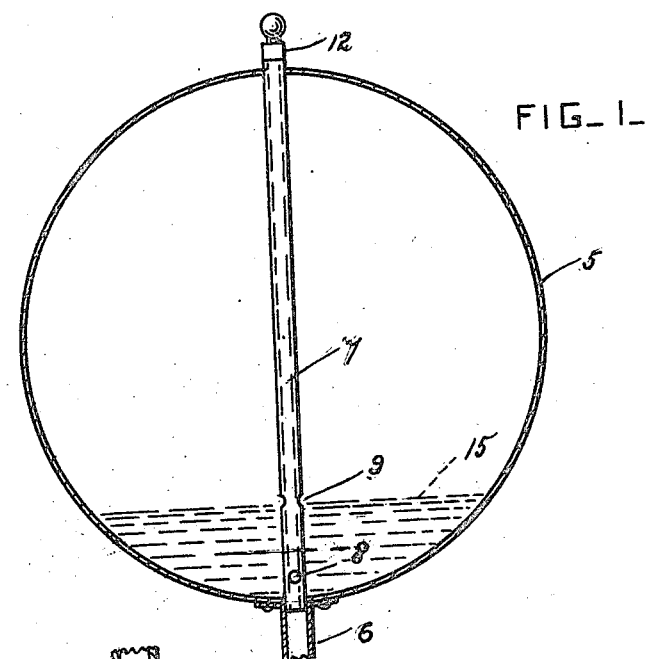
FIG_1_
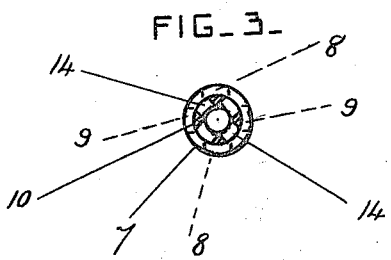
FIG_3_
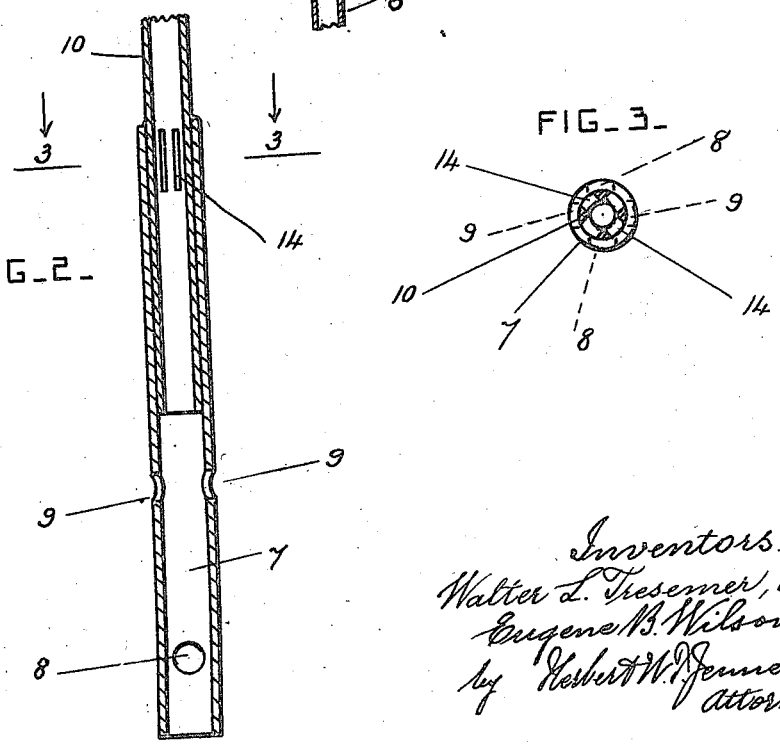
FIG_2_
Inventors:
Walter L. Tresemer, and
Eugene B. Wilson.
by Herbert W. Jenner,
Attorney.

Patented Mar. 13, 1923.

1,448,580

UNITED STATES PATENT OFFICE.

WALTER L. TRESEMER AND EUGENE B. WILSON, OF INDIANAPOLIS, INDIANA.

VALVE.

Application filed March 15, 1922. Serial No. 543,951.

*To all whom it may concern:*

Be it known that we, WALTER L. TRESEMER and EUGENE B. WILSON, citizens of the United States, residing at Indianapolis, in the county of Marion and State of Indiana, have invented certain new and useful Improvements in Valves, of which the following is a specification.

This invention relates to valves for gasoline tanks used on motor cars; and it consists in the novel construction and combination of the parts hereinafter fully described and claimed whereby the driver of the car is warned when a predetermined small quantity of gasoline remains in the tank.

In the drawings, Figure 1 is a cross-section through a gasoline tank provided with a valve according to this invention. Fig. 2 is a vertical section through the lower end portion of the valve, drawn to a greatly enlarged size, for clearness. Fig. 3 is a cross-section, taken on the line 3—3 in Fig. 2.

The tank 5 is a cylindrical vessel, such as ordinarily used on motor cars to carry a supply of gasoline for the engine. This tank is provided with an outlet pipe 6 at its bottom which conducts the gasoline to the engine. A cylindrical outer tube 7 is secured above the outlet pipe 6, and extends vertically to the top of the tank. The lower end of this tube 7 is open, and it communicates constantly with the outlet pipe, and it is secured to the tank by any approved means. This outer tube has lateral openings or passages 8 and 9, which are arranged at different levels in the tank. The lower opening 8 is arranged very near the bottom of the tank, and the upper opening 9 is arranged at a predetermined distance above the opening 8. Each opening may be a single hole, but it is preferable to provide a plurality of holes so as not to weaken the tube too much on one side.

An inner tube 10 is slidable inside the outer tube 7, and is closed at the upper end, which projects above the top of the tank. A plug 12 is shown for closing the tube 10, and for use as a handle to slide it up and down.

When the inner tube is pushed down to its full extent it completely closes the lower opening 8 of the outer tube. The inner tube is provided with an opening 14 which communicates with the upper opening 9 when the inner tube is pushed down, and this opening 14 is preferably a series of elongated holes or slots, so that a free passage is provided even if the inner tube is revolved, and so that the inner tube is not badly weakened.

When the tank is filled with gasoline, the inner tube is fully pushed down as shown in Fig. 1, and the gasoline is then supplied to the engine through the openings 9 and 14 until it reaches the level 15 indicated by dotted lines, when the engine stops. A predetermined small quantity of gasoline then remains in the tank, and the driver of the car knows exactly how much gasoline he has left, and how far he can go without obtaining an additional supply. The driver then raises the inner tube, as shown in Fig. 2, and the remainder of the gasoline is supplied to the engine through the lower opening 8 which is uncovered.

What we claim is:

The combination, with a tank for liquid having an outlet pipe at its bottom, of an outer tube secured in holes in the top and bottom of the tank and projecting into the said outlet pipe, said outer tube having two lateral outlet holes arranged at different levels in the tank, and an inner tube open at its lower end and slidable in the outer tube, said inner tube having a series of slots spaced around its periphery which communicate with the upper outlet hole when the inner tube is pushed down so as to close the lower outlet hole, said inner tube being free to slide and rotate in the outer tube.

In testimony whereof we affix our signatures.

WALTER L. TRESEMER.
EUGENE B. WILSON.